US012318962B2

(12) United States Patent
Casoni et al.

(10) Patent No.: US 12,318,962 B2
(45) Date of Patent: Jun. 3, 2025

(54) MACHINE AND METHOD FOR DECORATING ITEMS WITH GRANULAR MATERIALS

(71) Applicant: Projecta Engineering S.r.l., Fiorano Modenese (IT)

(72) Inventors: Francesco Casoni, Reggio Emilia (IT); Fabio Tarozzi, Formigine (IT)

(73) Assignee: Projecta Engineering S.r.l., Fiorano Modenese (IT)

( * ) Notice: Subject to any disclaimer, the term of this patent is extended or adjusted under 35 U.S.C. 154(b) by 705 days.

(21) Appl. No.: 17/623,467

(22) PCT Filed: Jun. 29, 2020

(86) PCT No.: PCT/IB2020/056120

§ 371 (c)(1),
(2) Date: Dec. 28, 2021

(87) PCT Pub. No.: WO2020/261237

PCT Pub. Date: Dec. 30, 2020

(65) Prior Publication Data

US 2022/0347884 A1 Nov. 3, 2022

(30) Foreign Application Priority Data

Jun. 28, 2019 (IT) ........................ 102019000010464

(51) Int. Cl.
*B05C 19/04* (2006.01)
*B28B 11/00* (2006.01)
(Continued)

(52) U.S. Cl.
CPC ............ *B28B 11/001* (2013.01); *B05C 19/04* (2013.01); *B28B 11/049* (2013.01); *B28B 11/06* (2013.01);
(Continued)

(58) Field of Classification Search
None
See application file for complete search history.

(56) References Cited

U.S. PATENT DOCUMENTS

2014/0028772 A1* 1/2014 Pervan ..................... B41J 3/407 347/110
2015/0165739 A1* 6/2015 Taniuchi ............. B41J 11/0015 118/308
2023/0191803 A1* 6/2023 Malatesta ............. B41J 11/007 347/102

FOREIGN PATENT DOCUMENTS

ES 2465415 A2 * 6/2014 ............. B41J 3/407
WO WO-2014109699 A1 * 7/2014 ............. B41J 3/407
WO 2018211435 A1 11/2018

OTHER PUBLICATIONS

International Search Report for PCT/IB2020/056120 dated Oct. 9, 2020 (2 pages).

(Continued)

*Primary Examiner* — Binu Thomas
(74) *Attorney, Agent, or Firm* — ASLAN LAW, P.C.

(57) ABSTRACT

A machine for decorating items with granular materials, including at least one transportation device, adapted to convey the items to be decorated along a feed direction (A) and a feed orientation (V), and at least one decoration assembly of the items (P), supported above the transportation device and adapted to deposit, on the surface of each item (P), a certain quantity of granular material (M) so as to achieve a determined aesthetic effect. The decoration assembly includes a first module for dispensing adhesive fluid, of the type provided with heads with dispensing nozzles, adapted to dispense at least a first layer of adhesive fluid on the surface of the item (P) to be decorated according to a specific decorative pattern or motif, and at least one supplying device of granular material.

10 Claims, 9 Drawing Sheets

(51) Int. Cl.
*B28B 11/04* (2006.01)
*B28B 11/06* (2006.01)
*B41J 3/407* (2006.01)
*B41M 3/00* (2006.01)
*B44C 3/02* (2006.01)

(52) U.S. Cl.
CPC .............. *B41J 3/407* (2013.01); *B41M 3/006* (2013.01); *B44C 3/025* (2013.01)

(56) References Cited

OTHER PUBLICATIONS

Written Opinion for PCT/IB2020/056120 dated Dec. 30, 2020 (6 pages).

* cited by examiner

MACHINE AND METHOD FOR DECORATING ITEMS WITH GRANULAR MATERIALS

CROSS-REFERENCE TO RELATED APPLICATIONS

This application claims priority to IT patent application Ser. No. 102019000010464 filed on Jun. 28, 2019, and this application claims priority to and is a 371 of international PCT Application No. PCT/IB2020/056120 filed on Jun. 29, 2020, the entire contents of which are hereby incorporated by reference.

TECHNICAL FIELD

The present invention relates to a machine and a method for decorating items with granular materials.

More in particular, the present invention relates to a machine and a method for decorating items such as ceramic tiles and the like with granular materials so as to create certain effects not obtainable with normal inks or decorative fluids, for example veining, or areas in relief with a certain thickness with respect to the application surface, or even particular aesthetic effects which derive from the specific granular materials used.

BACKGROUND ART

In some manufacturing sectors, such as the production of items such as ceramic tiles and the like, decorative machines are currently used to apply granular materials on the surface of the items, which have the function of creating a certain aesthetic result.

For example, such materials in granular form allow to obtain, on the surface of the items, veining, areas in relief with a certain thickness with respect to the application surface, or even particular aesthetic effects which derive from the specific granular materials used. With particular reference to a typical plant for the production of ceramic items, such as tiles and the like, a decorating machine of this type is usually positioned between the press which realizes the items and the firing oven.

In more detail, a decorating machine of this type usually comprises at least one digital printing head, provided with a plurality of heads suitable for applying, on the surface of the treated item, at least one layer of a fluid with adhesive properties, in particular a liquid glue.

The digital printing head, appropriately controlled by the machine's control unit, allows to create on the surface of the treated item, and through the aforementioned adhesive fluid, a predetermined decorative pattern or motif, which can be of any type in relation to the final result which is intended to be obtained.

The machine also comprises means for depositing, by falling, granular materials on the surface of the item, and therefore also on the adhesive fluid.

The deposited granular materials adhere to the adhesive fluid which, by drying (for example simply in air, or through specially arranged specific means) retains them in the established position, precisely by means of the pattern or design made with the adhesive fluid.

There is then usually a final step of removing the exceeding granular materials, i.e. those particles of material which, during the deposition, randomly accumulated on the surface of the item and did not adhere to the layer of adhesive fluid or, in other words, are extraneous to the decorative motif to be obtained.

This removal is typically carried out by means of a suction device, positioned downstream of the other machine stations.

The machine stations are arranged in sequence along a conveyor, for example a conveyor belt, which moves the items to be decorated, through the various stations, along a feed direction.

However, this machine has some drawbacks.

Especially—but not exclusively—if the granular material must be deposited on the surface of an item in rather large quantities, for example to obtain decorated areas of a certain thickness, there are often significant differences in the final results obtained, which are therefore not perfectly repeatable.

In fact, although the depositing station can be controlled and managed in such a way as to unload, on the surface of the items, substantially uniform quantities of granular material, there is no type of control, on the other hand, at the subsequent removal station of the exceeding material.

The latter, in fact, in addition to removing the granular material deposited outside the design or motif formed by the adhesive fluid (which is therefore not part of the decoration), can sometimes inadvertently remove the same material deposited inside the motif or design itself.

For example, this can happen, precisely, if the amount of granular material deposited is rather significant, and therefore only the particles of the lower layer are actually retained and immobilized by the adhesive fluid; those that belong, instead, to the upper layers, or outermost layers, are constrained less effectively, and therefore risk being accidentally removed by the suction device.

It follows that the state of each item exiting from the decorating machine, before entering the firing oven, can greatly depend on the behaviour of all the stations of the machine, including also the suction station of the exceeding granular material, which can determine, in a way which is effectively uncontrollable with precision, the quantity of granular particles which actually remain on the item, effectively retained by the adhesive material.

These possible differences in the decoration of the items exiting from the machine can become even more evident after the passage in the firing oven, in which, usually, the deposited granular materials merge to give rise to uniform and compact decorative surfaces.

Another major drawback affecting the machines of known type arises from the considerable amount of dusts and other impurities which accompany the granular material used to decorate the items.

During the operation of the machine, in which, as mentioned, the granular material is deposited by gravity on the surface of the items, the aforementioned dusts and impurities spread abundantly, and uncontrollably, throughout the working area of the machine (in particular in the area of the printing head for dispensing the adhesive fluid) and also in the external environment.

For this reason, it is necessary to carry out a very frequent and accurate cleaning of the heads which dispense the adhesive fluid, and more generally of the entire item transit area.

This clearly entails considerable costs due to the installation of the necessary cleaning equipment and also the stops necessary to carry out the interventions.

In addition, the dusts and impurities which continuously spread into the environment may be potentially harmful to the health of operators, and there is therefore a need to limit this phenomenon.

SUMMARY OF THE INVENTION

The technical task of the present invention is therefore to improve the state of the art. Within the scope of such technical task, an object of the present invention is to realize a machine for decorating items with granular materials which allows to overcome the above-mentioned drawbacks.

Another object of the present invention is to devise a machine for decorating items with granular materials which allows for qualitatively superior decorative results compared to the machines of known type A further object of the present invention is to provide a machine for decorating items with granular materials which allows uniform and repeatable decorative results to be obtained. Yet another object of the present invention is to develop a machine for decorating items with granular materials which allows to create, with granular materials, even considerable thicknesses without compromising the quality of the decorations.

Another object of the present invention is to provide a machine for decorating items with granular materials which allows to limit the spread of dusts or other impurities in the dispensing area of the adhesive material.

Another object of the present invention is to provide a machine for decorating items with granular materials which allows to limit the spread of dusts or other impurities in the external environment.

This task and these and other objects are achieved by the machine for decorating items with granular materials according to the present application.

The machine comprises at least one transportation device, adapted to convey the items to be decorated along a feed direction and a feed orientation, and at least one decoration assembly of the items, supported above the transportation device and adapted to deposit, on the surface of each item, a certain amount of granular material so as to achieve a determined aesthetic effect.

The decoration assembly comprises a first module for dispensing adhesive fluid, of the type provided with heads with dispensing nozzles, adapted to dispense at least a first layer of adhesive fluid on the surface of the item to be decorated according to a specific decorative pattern or motif.

The decoration assembly further comprises at least one supplying device of granular material, arranged adjacent to the first module and downstream of the same first module with respect to the feed orientation, adapted to dispense at least one layer of granular material on the portion of the surface of the item in which the first layer of adhesive fluid is present.

The decoration assembly further comprises a second module for dispensing adhesive fluid, of the type provided with heads with dispensing nozzles, arranged adjacent to the supplying device and downstream of the same supplying device with respect to the feed orientation of the items, adapted to dispense a second layer of adhesive fluid on the previously deposited layer of granular material; said second layer is superimposed on the decorative pattern or motif created by the first layer of adhesive fluid.

Preferably, the pattern or motif of the second layer of adhesive fluid is identical to that of the first layer of adhesive fluid.

The solution of applying a second layer of adhesive fluid directly to the granular material allows the latter to be firmly fixed to the surface of the item, preventing accidental displacement, removal or alteration of the granular material itself.

The qualitative result on the item is therefore better and much more repeatable.

The present application refers to preferred and advantageous embodiments of the invention.

BRIEF DESCRIPTION OF THE DRAWINGS

The features of the invention will be better understood by anyone skilled in the art from the description below and the accompanying drawings, given as a non-limiting example, wherein.

DETAILED DESCRIPTION OF THE INVENTION

Figure 1:
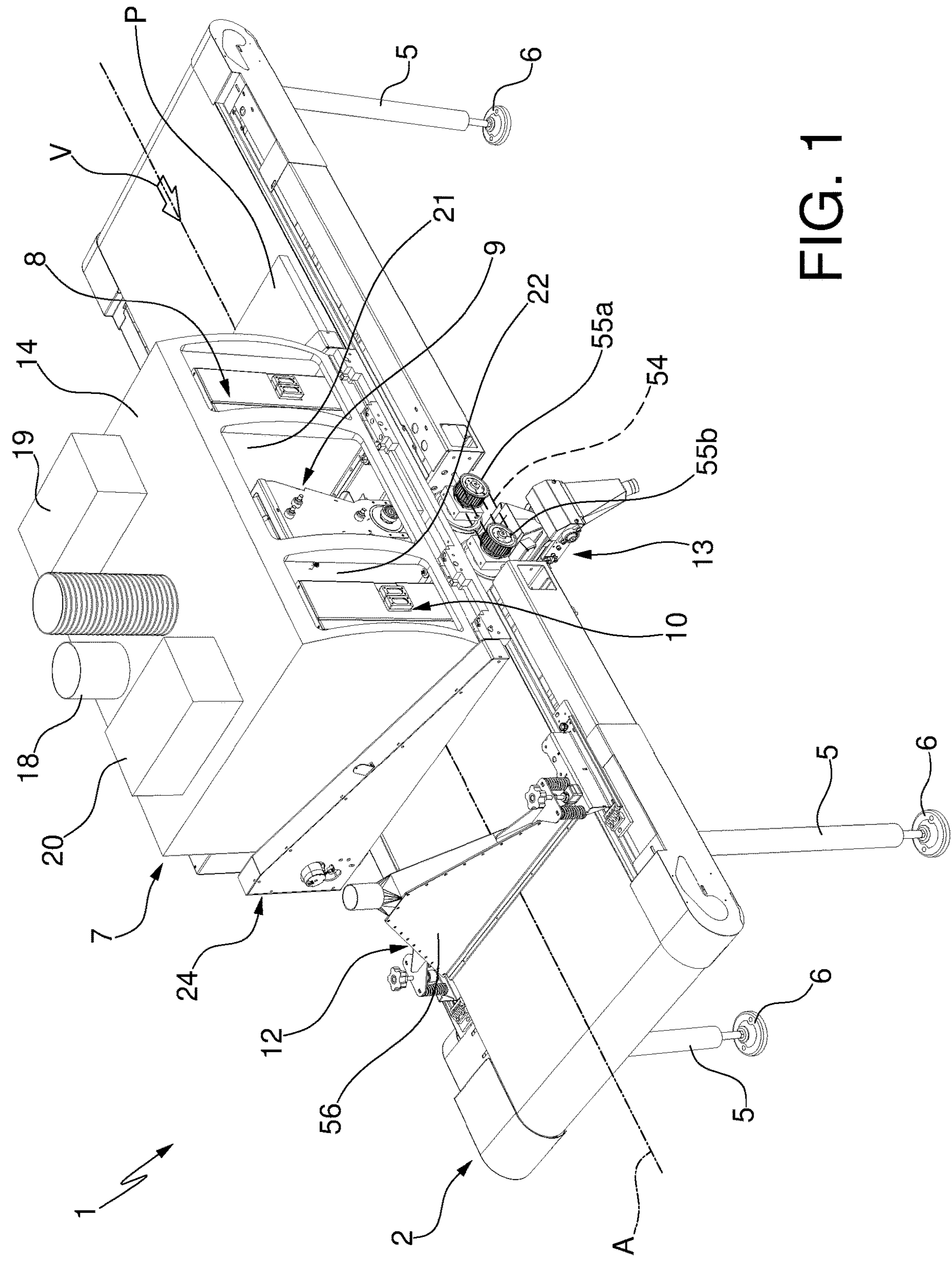
FIG. 1 is an axonometric view of a machine for decorating items with granular materials according to the invention, with some parts removed for greater clarity.
Figure 2:
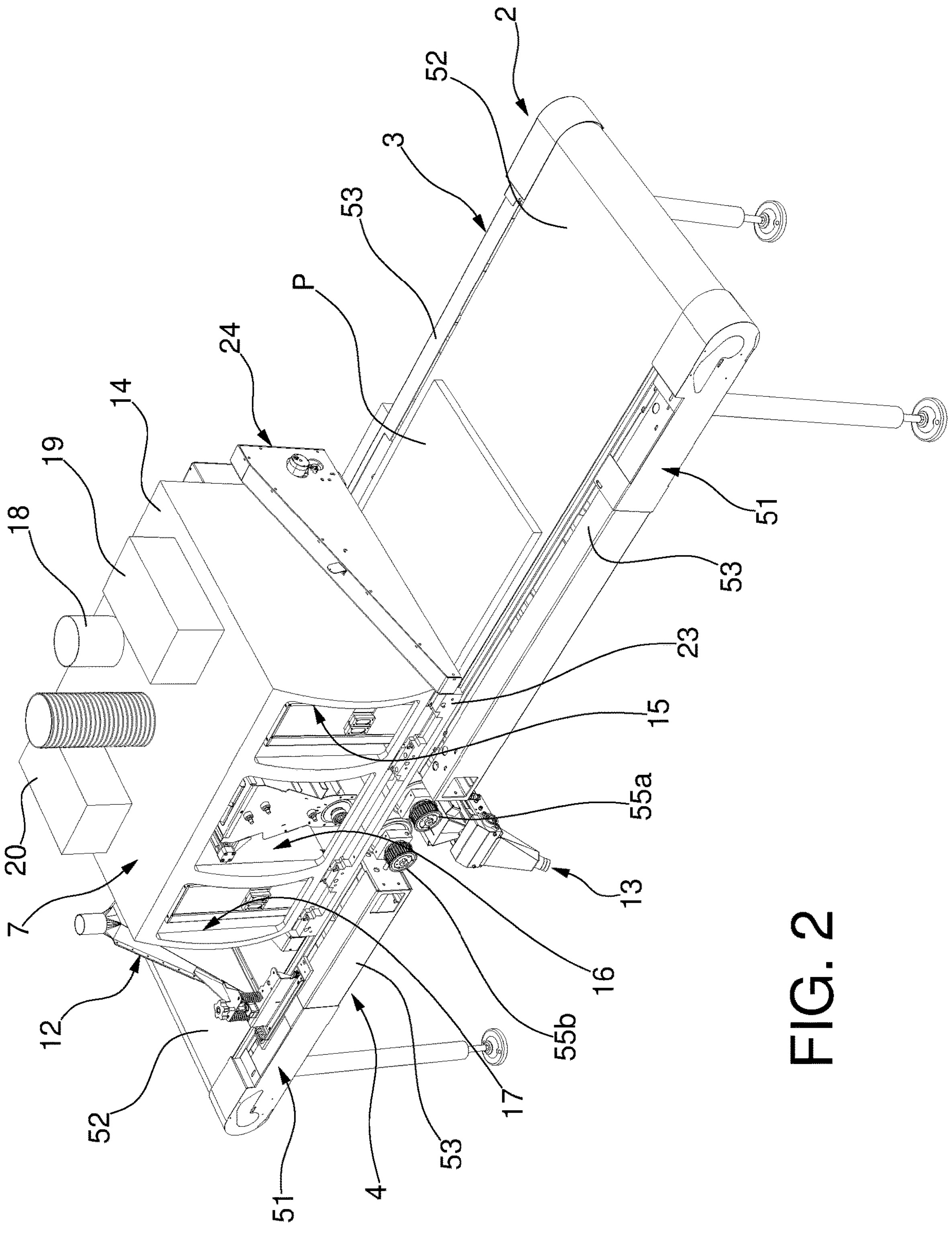
FIG. 2 is another axonometric view, from a different angle, of the same machine.
Figure 3:
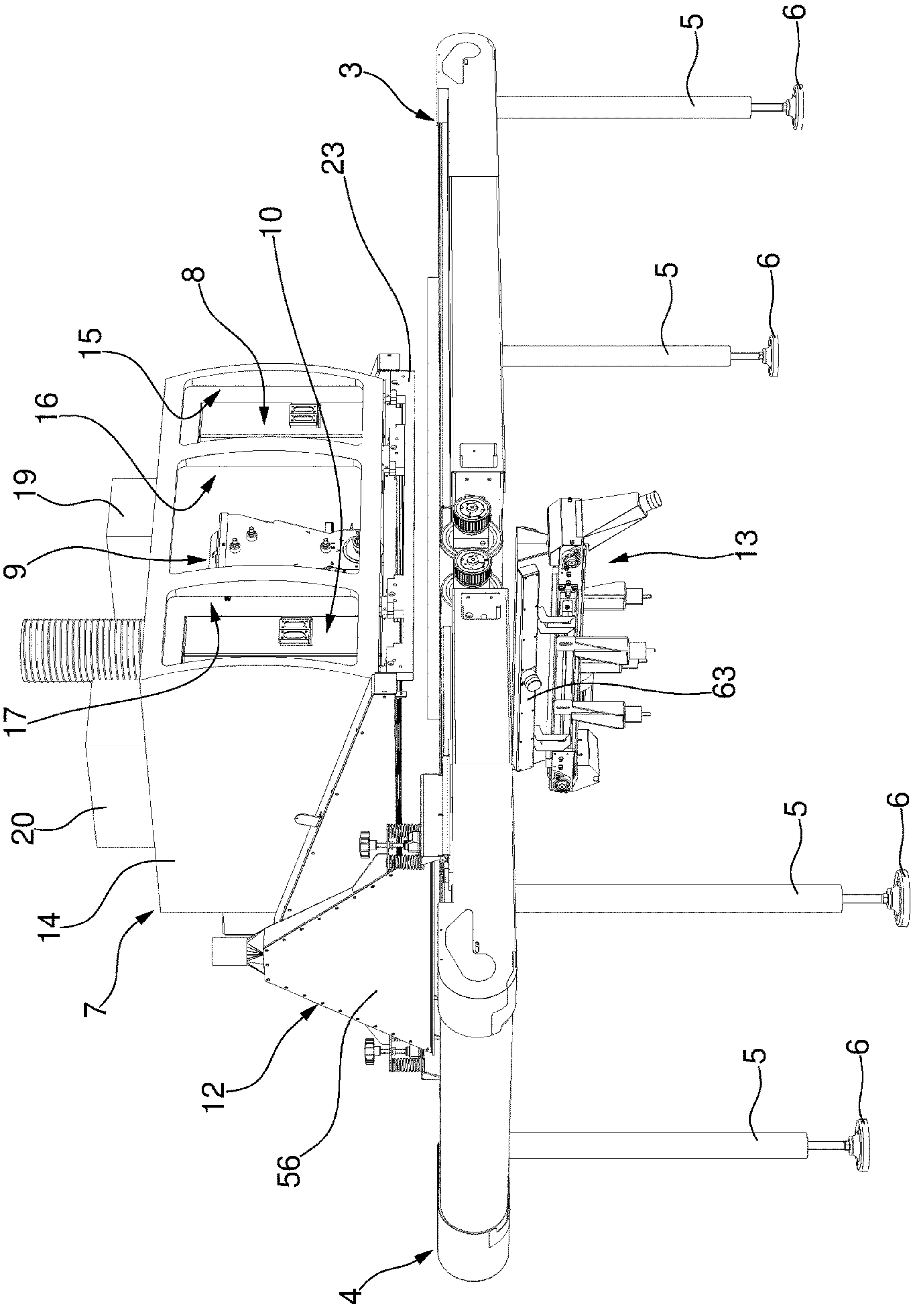
FIG. 3 is another axonometric view of the same machine, from a further angle.
Figure 4:
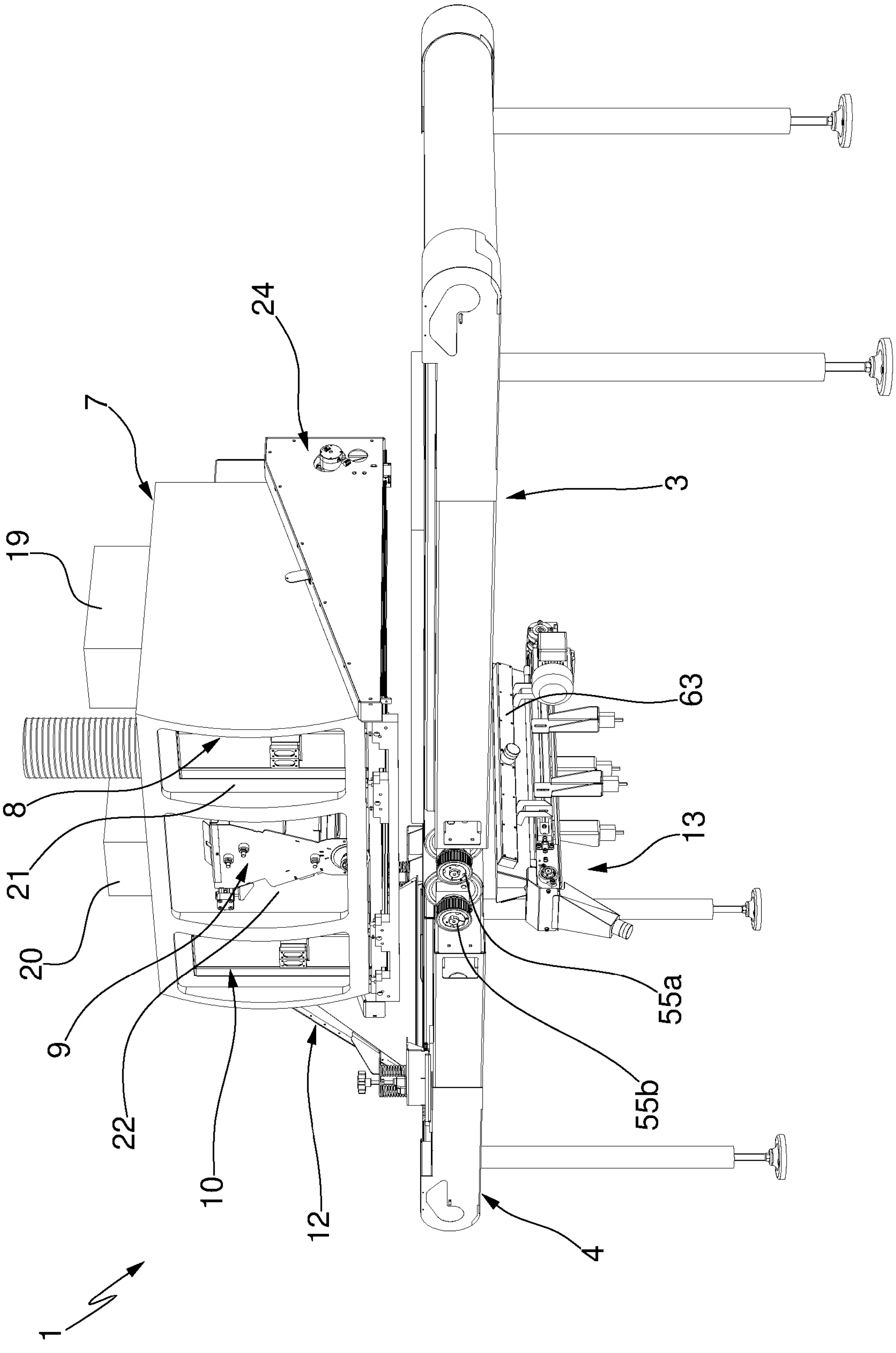
FIG. 4 is a further axonometric view of the machine, from yet another angle.
Figure 5:
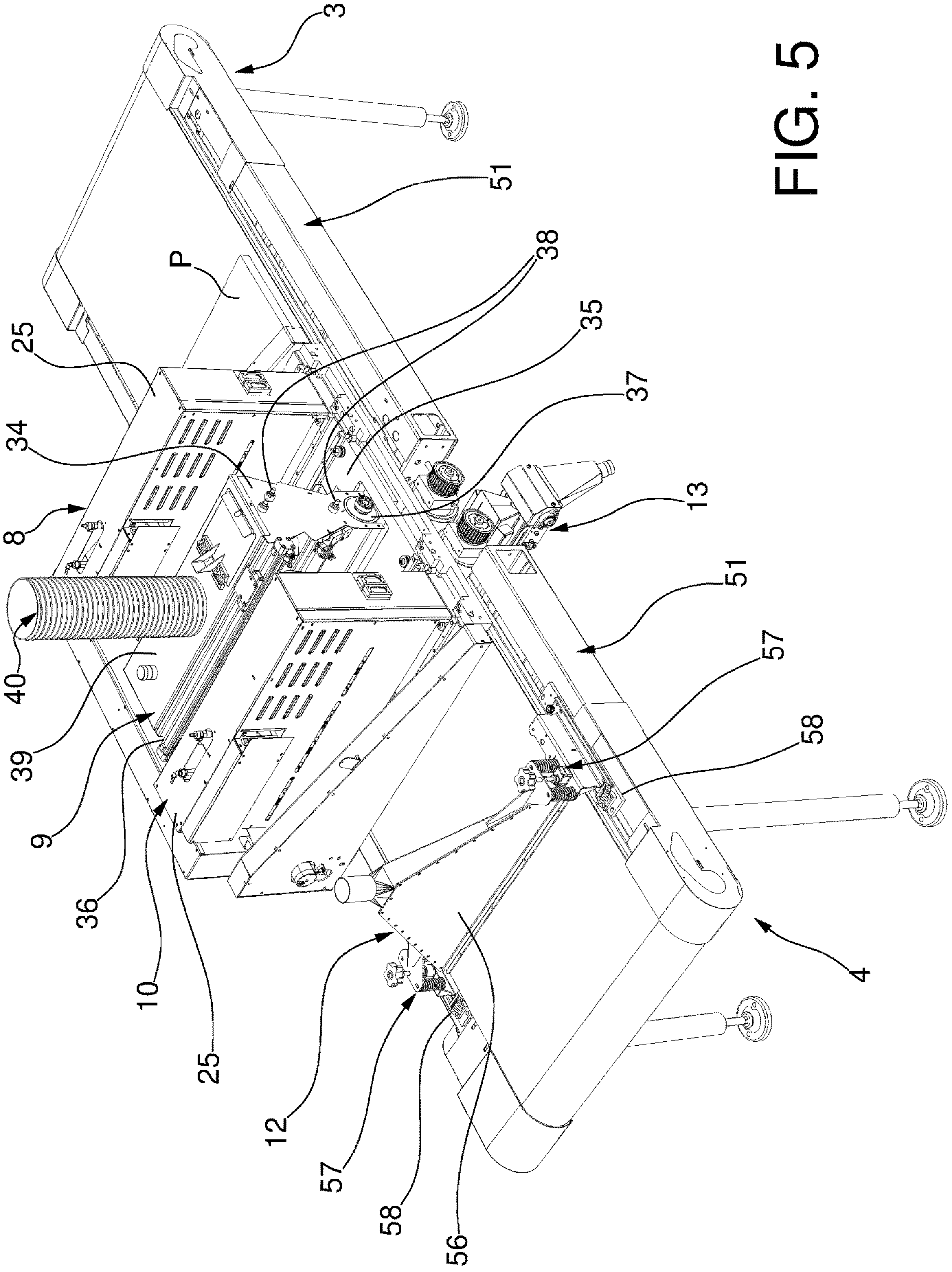
FIG. 5 is an axonometric view of machine, with the casings removed for greater clarity.

With reference to the attached FIG. 1, the number 1 generally indicates a machine for decorating items with granular material according to the present invention.

The following description will refer explicitly to items consisting of ceramic tiles, or slabs, of any shape and size.

It should be noted, however, that the teachings of the present invention can also be used interchangeably for the decoration, with granular materials, of items of another type, for example ceramic items of another type, or items made of other materials, without particular limitations.

With specific reference to the application, of considerable practical interest, concerning the production of ceramic tiles, ceramic slabs, or the like, the machine 1 according to the present invention may preferably be installed between a press (or a press system) which realizes the items, and an oven for an oven system) for firing the items themselves.

In general, the machine 1 comprises at least one transportation device 2, adapted to convey the items to be decorated P along a feed direction A, through the various assemblies of the machine 1.

Figure 7:
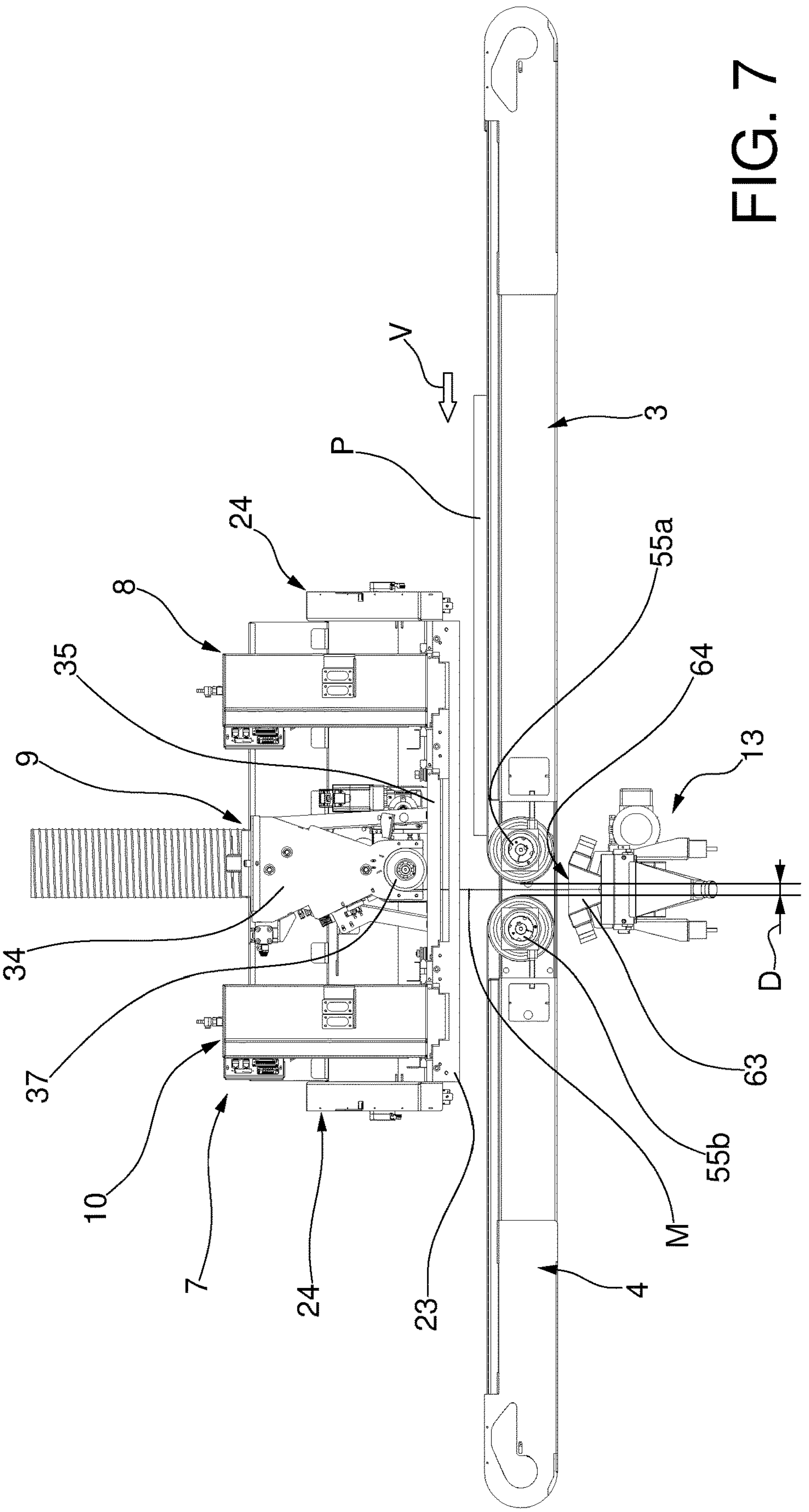
FIG. 7 is a front view of the machine, with the casings and other parts removed, for greater clarity.

In more detail, the transportation device 2 is adapted to feed the items P, along the aforementioned feed direction A, according to a certain feed orientation, schematically indicated by the arrow V of FIGS. 1 and 7.

The transportation device 2 comprises, in more detail, a first conveyor 3 and a second conveyor 4.

The first conveyor 3 and the second conveyor 4 are arranged aligned along the aforementioned feed direction A.

More specifically, the first conveyor 3 and the second conveyor 4 are aligned so that, between the respective opposite and facing ends, a certain distance D is provided, that is, between the two conveyors 3, 4 a certain space is provided, whose specific function will be clarified later.

The transportation device 2 comprises legs 5 supporting the first conveyor 3 and the second conveyor 4.

For example, the transportation device 2 comprises four, or even more, legs 5, with respective adjustable feet 6.

The machine 1 further comprises at least one decoration assembly 7 of the items P.

The decoration assembly 7 is adapted to deposit, on the surface of each item P, a certain quantity of granular material M, so as to achieve a determined aesthetic effect consisting of a certain pattern or motif, obtained with the means and methods better clarified below. The decoration assembly 7 is supported above the transportation device 2.

The decoration assembly 7 is located at an appropriate distance from the feed surface of the items P on the transportation device 2.

According to one aspect of the invention, the decoration assembly 7 comprises a first module 8 for dispensing adhesive fluid.

The first module 8 comprises a plurality of heads, provided with nozzles for dispensing at least one adhesive fluid to be deposited on the surface of the items P to be decorated. More specifically, the first module 8 is adapted to dispense at least a first layer of adhesive fluid on the surface of the item P to be decorated, so as to achieve a certain pattern or motif, which may be any.

The technology for operating and controlling the operation of the nozzles of the heads is essentially the same as that used in digital ink-jet printing machines in the ceramic tile decoration sector and the like.

According to another aspect of the invention, the decoration assembly 7 comprises at least one supplying device 9 of the granular material M on the surface of the items P to be decorated.

The supplying device 9 is installed, inside the decoration assembly 7, so as to be immediately downstream of the first module 8, with reference to the feed orientation V of the items P.

The supplying device 9 is therefore arranged immediately adjacent to the first module 8. The supplying device 9 is adapted to dispense at least one layer of granular material M on the entire surface of the item to be decorated P, or on one or more portions of such surface, in relation to the specific result to be obtained.

In any case, the supplying device 9 is suitable for dispensing at least one layer of granular material M on at least the portion of the surface of the item P in which the first layer of adhesive fluid is present.

In particular, to prevent the adhesive fluid from drying out before the deposit of the granular material M, or in any case assuming a consistency not suitable for obtaining the correct adhesion of the same material, the first module 8 and the supplying device 9 are positioned at a mutual distance which is less than the product of the feed speed of each item P on the transportation device 2 and the drying time of the adhesive fluid deposited by the first module 8.

This is equivalent to saying that the item P arrives below the supplying device 9, to receive the granular material M, before the adhesive fluid deposited by the first module 8 has dried, or has assumed an unsuitable consistency.

In practice, using adhesive fluids with average drying times, the mutual distance between the first module 8 and the supplying device 9 is indicatively between about 250 mm and about 450 mm.

According to yet another aspect of the invention, the decoration assembly 7 comprises a second module 10 for dispensing at least one adhesive fluid.

The second module 10 comprises a plurality of heads, provided with nozzles for dispensing at least a second layer of adhesive fluid.

The second module 10 is installed, inside the decoration assembly 7, so as to be immediately downstream of the supplying device 9 with reference to the feed orientation V of the items P.

The second module 10 is therefore arranged adjacent to the supplying device 9.

The second module 10 is adapted to dispense at least a second layer of adhesive fluid onto the previously deposited layer of granular material M.

Preferably, but not exclusively, the second layer of adhesive fluid is deposited, on the layer of granular material M, with the same pattern or motif with which the first layer of adhesive fluid is deposited.

In any case, the second layer of adhesive fluid is deposited so as to completely superimpose the layer of granular material M previously deposited.

Thanks to this arrangement, and as will be better clarified in the following, the layer of granular material M, which is to be entirely retained on the item P before the next processing step (i.e., typically, firing in the oven), is effectively locked in place by the second layer of adhesive fluid, and therefore it is cannot accidentally move.

To prevent the second layer of adhesive fluid from altering the characteristics of the decoration made by the supplying device 9, it is also possible to position the second module 10, inside the decoration assembly, so that the mutual distance between the second module 10 and the first module 8 is greater than the product of the feed speed of the items P on the transportation device 2 and the drying time of the adhesive fluid applied by the first module 8.

This is equivalent to saying that the second layer of adhesive fluid is deposited only when the first layer is completely dried, and therefore when the granular material M is correctly retained in position, without the possibility of accidentally moving.

In practice, using adhesive fluids with average drying times, the mutual distance between the second module 10 and the first module 8 is indicatively between about 250 mm and about 450 mm.

Figure 8:
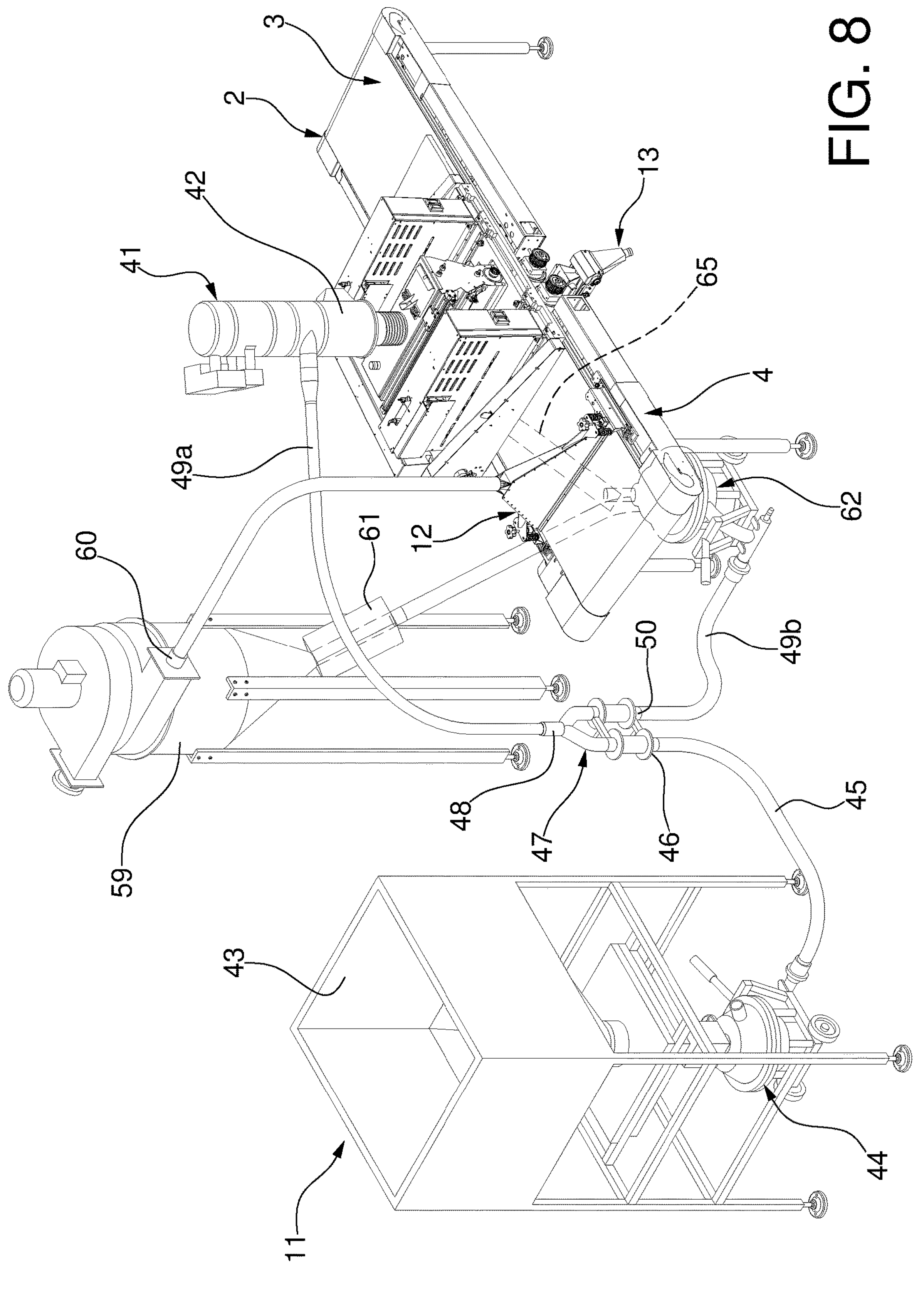
FIG. 8 is an axonometric view of the machine, together with a schematic representation of the input and/or recirculation systems of the granular material.

The machine 1 further comprises input means 11 of the granular material M to the supplying device 9 (shown, in particular, in FIG. 8).

The machine 1 further comprises a device 12 for removing the exceeding granular material M from the surface of the items P exiting from the decoration assembly 7.

More particularly, the removal device 12 has the function of removing, from the surface of the items P exiting from the decoration assembly 7, the granular material M which has been deposited outside the pattern or motif of the first layer of adhesive fluid realized by the first module 8, and/or which is not properly retained in the desired position by the second layer of adhesive fluid applied by the second module 10.

In other words, the task of the removal device 12 is to clean the surface of the item P exiting from the decoration assembly 7 of all the granular material M extraneous to the desired decoration, and also of the dusts and impurities that accompany the dispensing of the granular material M.

The removal device 12 may preferably be—but not exclusively—of the suction type.

The solution of removal by suction provides considerable cleaning guarantees, as the unwanted materials are completely eliminated from the environment.

In other embodiments, however, the removal device could operate according to other principles, for example by blowing, by washing, or still others.

The removal device 12 is installed, in the machine 1, so as to be immediately downstream of the decoration assembly 7, with reference to the feed orientation V of the items P.

The removal device 12 is therefore arranged adjacent to the decoration assembly 7.

To avoid uncontrollably removing granular material from the desired decorative pattern or motif area, the removal device 12 is positioned, with respect to the second module 10 of the decoration assembly 7, at a distance greater than the product of the feed speed of the items P on the transportation device 2 and the drying time of the adhesive fluid applied by the second module 10.

This is equivalent to saying that the item P arrives below the removal device 12 after the adhesive fluid deposited by the second module 8 has dried, or has in any case assumed a consistency such as to retain the granular material deposited by the supplying device 9. According to another aspect of the invention, the machine 1 comprises means 13 for recovering the material dispensed by the supplying device 9 and not used in the decoration of the items P, in order to recycle them back into the input cycle of the machine 1 in order to be reused.

As better described below, the recovery means 13 allow the reuse of the granular material M collected by the removal device 12, and also that collected in another way, as clarified in the following.

According to yet another aspect of the invention, the decoration assembly 7 comprises at least one outer casing 14, which completely encloses the first module 8, the supplying device 9 and the second module 10.

Alternatively, each of the modules 8, 10 and the supplying device 9 could be provided with independent and autonomous casings thereof.

The casing 14 has the function of isolating the decoration assembly 7 from the surrounding environment, to prevent the granular material M, and especially the dusts and impurities that usually accompany it in an abundant manner, from dispersing in the environment in an uncontrolled manner.

Furthermore, the casing 14 has the function of preventing the granular material M, dusts and impurities passing through the supplying device 9 from spreading towards the first module 8 and/or towards the second module 10, in particular in the area of the respective heads which, if soiled, could be subject to malfunctions.

For the latter reason, the casing 14 comprises three distinct compartments 15, 16, hermetically separated from each other.

More specifically, the casing 14 comprises: a first compartment 15 housing the first module 8; a second central compartment 16, housing the supplying device 9; a third compartment 17, housing the second module 10.

The three compartments 15, 16, 17 are all open below, to allow the two modules 8, 10 and the supplying device 9 to dispense the respective materials on the items P in transit. Furthermore, the three compartments 15, 16, 17 are closed, in front, by transparent elements which allow the inspection thereof (e.g. glass, or polymer material).

According to another aspect of the invention, given the different nature of the materials dispensed and the different functional needs of the individual devices, the casing 14 is configured so as to realize different respective modes of affecting the aforementioned three compartments 15, 16, 17.

More in particular, the casing 14 comprises a suction device 18, adapted to remove from the second central compartment 16 the dusts and impurities which spread during the dispensing of the granular material M.

The suction device 18 may be of any type suitable for this specific application.

The suction device 18 may be connected to a collection bin (not shown in the figures), which allows to isolate the dusts and impurities removed from the second compartment 16.

In addition, the casing 14 comprises a first fan 19, adapted to overpressurize the first compartment 15, in which the first module 8 is contained: this prevents impurities from the outside from entering the first compartment 15.

Likewise, again to prevent the entrance of impurities, the casing 14 comprises a second fan 20, adapted to overpressurize the third compartment 17, in which the second module 10 is contained.

The casing 14 comprises, in order to obtain the aforementioned three compartments 15, 16, 17 hermetically separated from each other, a first internal septum 21 and a second internal septum 22, which respectively separate the first compartment 15 from the second compartment 16 and, in turn, the second compartment 16 from the third compartment 17. The decoration assembly 7 further comprises a lower plate 23, which supports the supplying device 9 and the modules 8, 10.

The lower plate 23 is cantilevered, above the transportation device 2, by fixed parts of the machine, which can be united with the same transportation device 2 or to an autonomous base, which can also be associated with the electrical cabinet of the machine 1.

The lower plate 23 comprises windows, or slits, from which the heads of the first module 8 and the second module 10 protrude, and through which the granular material M is supplied, by falling, by the supplying device 9.

The lower plate 23 may further comprise suction members having the task of removing any exceeding fluid, dispensed by the heads of the first module 8 and the second module 10, which may be suspended in nebulized form inside the decoration assembly 7, and which may uncontrollably settle on the surface of the items P.

The decoration assembly 7 comprises a cleaning device 24 of the heads of the module 8 and the second module 10.

The cleaning device 24 may comprise at least one suction member (not shown in the figures) driven to translate below the heads themselves, for example according to a translation direction perpendicular to the feed direction A of the items P.

The cleaning device 24 comprises operating means of said suction member.

The operating means may be, for example, installed at the sides of the casing 14, where sides refers to the walls of the casing 14 itself orthogonal to the feed direction A of the items P along the transportation device 2.

The operating means of the suction member may include, for example, belt, chain, or similar translation members adapted to determine the translation motion of said suction member between two opposite end-strokes, in the direction orthogonal to the feed direction A, The first module 8 and the second module 10 each comprise a respective adhesive fluid dispensing system, adapted to supply the respective heads.

The adhesive fluid, dispensed from each module 8, 10, may be contained in respective tanks or reservoirs (not shown in the figures) installed, for example, below the conveyors 3, 4 of the transportation device 2.

Each module 8, 10 comprises a respective box-like element 25, which supports all the major components of the respective adhesive fluid dispensing system.

Figure 6:
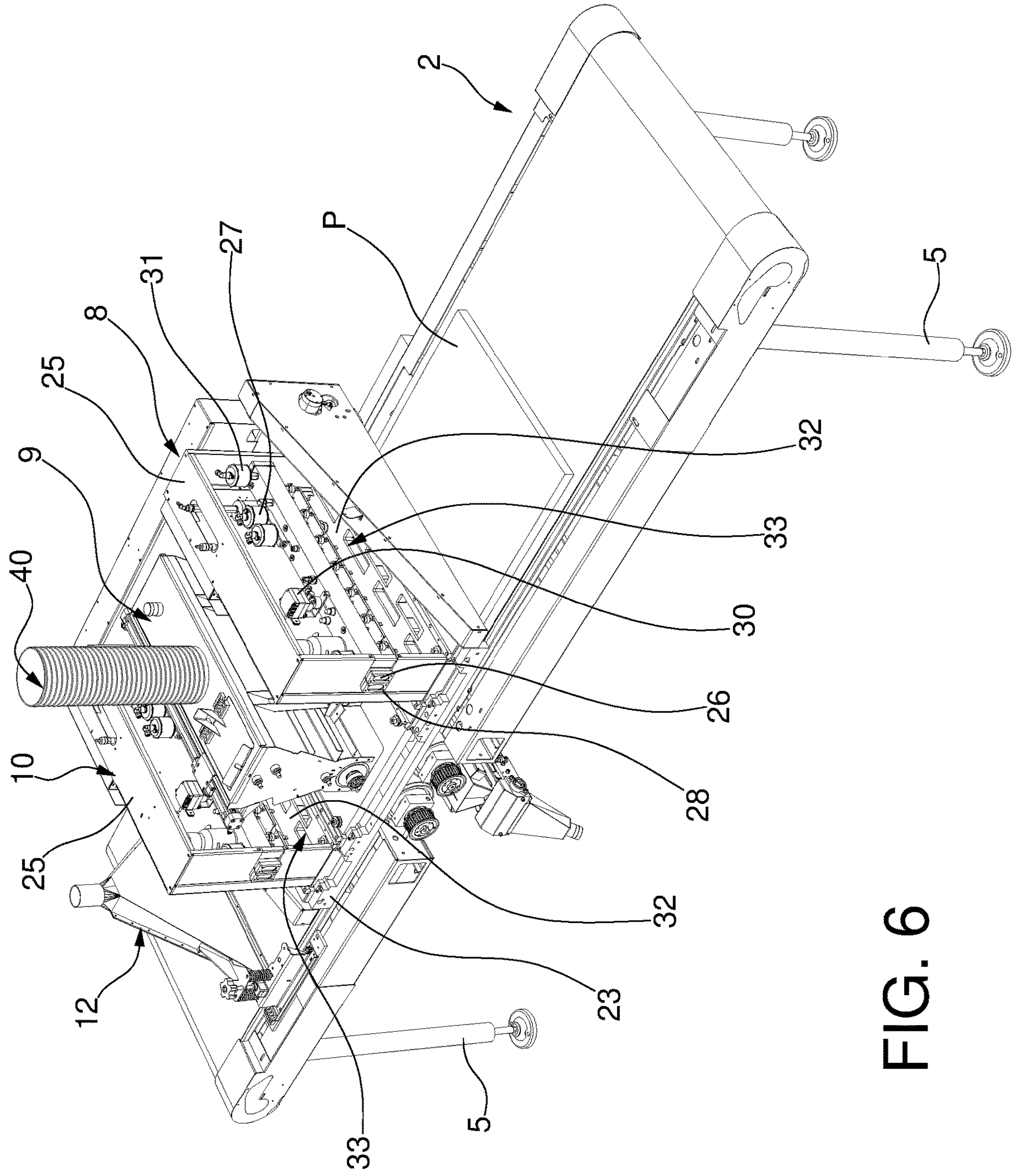
FIG. 6 is another axonometric view of the machine, with the casings and other parts removed, for greater clarity.

More in particular, the adhesive fluid to input to each module 8, 10 is withdrawn, from the respective tank, by a pump (not shown), which sends it to a loading tank 26, passing through a loading filter 27 (see in particular FIG. 6).

The adhesive fluid dispensing system may also comprise recirculation means of the fluid itself, adapted to prevent the fluid contained in the tank and/or circulating along the system itself from drying and thus causing malfunctions, especially of the heads.

Such recirculation means may comprise a recirculation tank 28, an expansion vessel, a recirculation pump 30, and a recirculation filter 31.

The dispensing system may also comprise a device for heating the adhesive fluid to be dispensed.

Each box-like element 25 may be translatable with respect to the lower plate 23, according to a direction orthogonal with respect to the feed direction A of the items P.

Thanks to this arrangement, each box-like element 25 may be moved outside the plan dimensions of the transportation device 2, so as to be able to easily carry out the necessary maintenance operations.

Referring again to FIG. 6, each box--like element 25 comprises a respective lower wall 32, in which openings 33 are provided for housing the respective heads (not illustrated). The openings 33 may, for example, be arranged along two parallel rows, suitably offset to ensure the dispensing of the adhesive fluid over the entire surface of the item P to be decorated.

The supplying device 9 comprises a hopper 34, in which the granular material M to be deposited on the P items is collected.

The hopper 34 may be mounted on a carriage 35, slidable with respect to the lower plate 23 in a direction orthogonal to the feed direction A.

This allows, when necessary, to move the supplying device 9 out of the dimensions of the transportation device 2, for easier maintenance.

The hopper 34 comprises an upper opening through which the granular material M is introduced, and a lower opening through which the material is dispensed on the items P in transit; the lower opening may be adjusted by a shutter; the hopper 34 has a configuration converging downwards.

The supplying device 9 also comprises a uniforming member 36, for example pneumatically operated, which has the task of uniforming the level of the granular material M inside the hopper 34.

The supplying device 9 further comprises at least one supplying roller 37, supported at the base of the hopper 34.

The supplying roller 37 is driven by a motor; the supplying roller 37 being adapted to determine, with the rotation thereof, the fall of the granular material M contained in the hopper 34 on the items P in transit.

The supplying roller 37 may be operated at variable rotation speed.

This may allow to vary the flow rate of granular material M dispensed on the items P to be decorated, and thus to realize, for example, decorative motifs with different thicknesses.

The supplying device 9 may further comprise sensors 38 which detect the full and empty state of the hopper 34; furthermore, the supplying device 9 may comprise heating means of the granular material M to be dispensed.

The upper opening of the hopper 34 is closed by a lid 39. The lid 39 comprises a loading mouth 40 of the granular material M, through which the latter is introduced into the hopper 34.

Referring now to FIG. 8, the input means 11 comprise a pneumatic propeller 41 which inputs, to the supplying device 9, a mixture of air and granular material M: in other words, the air acts as a transport vehicle of the granular material M itself.

The pneumatic propeller 41 comprises a chamber in which a vacuum is generated, by means of compressed air; this chamber, at the appropriate moment, is placed in communication with the external environment through an appropriate adjustment valve, or tap.

The resulting recall of air which is generated drags the granular material M therewith, which is then unloaded through a special hatch.

Said pneumatic propeller 41 comprises a lower end 42 connected directly to the loading mouth 40 of the supplying device 9, so that the granular material M is collected in the hopper 34.

Furthermore, the input means 11 comprise a loading hopper 43, in which new granular material M is loaded, i.e. not yet used.

The input means 11 comprise a first vibro-sifter 44, into which the granular material M coming from the loading hopper 43 is introduced.

The first vibro-sifter 44 has the function of allowing, exclusively, the passage of granular material M, coming from the loading hopper 43, having a certain pre-set size: the waste material is unloaded outwards by falling, through a special orifice.

The input means 11 further comprise a first conduit 45 for transporting the granular air-material mixture M from the outlet of the first vibro-sifter 44 to the pneumatic propeller 41.

The first conduit 45 in turn communicates with the first inlet 46 of an exchange valve 47. The exchange valve 47 comprises an outlet 48 which, via a second conduit **49*a*, is placed in communication with the inlet of the pneumatic propeller 41**.

The recovery means 13 of the granular material M not used in the decoration are connected to the second inlet 50 of the exchange valve 47, through a third conduit **49*b***, as better described below.

The first conveyor 3 and the second conveyor 4 each comprise a frame 51 and a belt 52, which allows the feeding of the items P below the decoration assembly 7.

The closed-loop belt 52 is wound around two parallel rollers, supported in the frame 51. The axes of the two rollers are perpendicular to the feed direction A of the items P to be decorated.

The frame 51 of each of the conveyors 3, 4 comprises two longitudinal members 53, which support the rollers of the respective belt 52.

In each of the two conveyors 3, 4, a motorized. roller and an idle roller may be provided; the two rollers are supported at opposite ends of the frame 51.

Transmission means 54 may also be provided which kinematically connect the two conveyors 3, 4, so as to create a synchronism in the motion thereof.

For example, such transmission means 54 may comprise a belt, wound on two pulleys 55*a* , 55*b* , coaxial to the two opposite rollers of the two conveyors 3, 4; in this case, only one of the two conveyors 3, 4 comprises a drive motor (which is therefore unique for the entire transportation device 2).

The device for removing exceeding granular material M from the surface of the items P comprises at least one hood 56.

In particular, the hood 56 is fixed to the longitudinal members 53 of the frame 51 of a second conveyor 4, that is, the one arranged downstream with reference to the, feed orientation V of the items P.

The hood 56 may be fixed to the frame 51 of the second conveyor 4 by means of adjustment devices 57, which allow the height of the hood 56 to vary with respect to the surface of the belt 52, and thus with respect to the surface of the items P.

Furthermore, the hood 56 may be fixed to the frame 51 of the second conveyor 4 by means of a hinge 58; the hinge 58 allows the hood 56 to be raised/rotated with respect to the frame 51 for inspection and maintenance purposes.

Referring still to FIG. 8, the removal device 12 further comprises at least one cyclone separator 59, whose inlet 60 communicates with the outlet of the hood 56.

The discharge 61 of the cyclone separator 59 communicates with the inlet of a second vibro-sifter 62.

In turn, the outlet of the second vibro-sifter 62 communicates with the second inlet 50 of the exchange valve 47.

According to another aspect of the invention, the recovery means 13 also allow to reuse the granular material M dispensed by the supplying device 9 and which has not settled on the surface of the items P themselves, for reasons intrinsic to the operation of the machine 1

In fact, the supplying device 9 operates continuously, while the items P ad a transportation device 2 suitably spaced from one another.

Thus, in practice, at each production cycle, the supplying device 9 dispenses a portion of material onto the transportation device 2 before an item P arrives, and also a portion after the same item P has completely transited below it (i.e., before the next item P arrives). Of course, the supplying device 9 may also interrupt the dispensing of the granular material M, if—for any reason—the items P are very distant from each other or there is a lack of items P on the transportation device; shortly before the arrival of a new item P. the dispensing of the granular material M is always resumed with great precision thanks to the controls on the relative speeds of the supplying roller 37 and the conveyors 3, 4. Furthermore, usually, the width of the items P (i.e., the dimension orthogonal to the feed direction A) is less than the useful length of the supplying roller 37, therefore another part of the granular material M dispensed by the supplying device 9, at each production cycle, does not settle on the items P, but also falls, on the sides of the items P, towards the transportation device 2.

For this reason, the distance D is provided between the facing ends of the first conveyor 3 and the second conveyor 4, mentioned previously.

In fact, the granular material M dispensed by the supplying device 9, and not deposited on the items P, (that is, that which is dispensed in the period of time between the end of processing one item P and the start of processing the next) falls directly into the space provider: between the two conveyors 3, 4.

The recovery means 13 of the granular material M therefore comprise a collection member 63, positioned below the transportation device 2 at the space provided between the two conveyors 3, 4.

The collection member 63 has an elongated shape, substantially equal in length to the width of the belts 52 of the first conveyor 3 and the second conveyor 4.

The collection member 63 comprises an upper mouth 64, of substantially downwardly converging shape, which runs along the entire length of the collection member 63 itself, and which is adapted to accumulate the granular material M in a subsequent collection area.

As schematically shown in FIG. 8, the recovery means 13 comprise a conveyor 65 (e.g., a belt, or the like) which has the task of conveying the granular material M accumulated inside the collection member 63 to means which allow its subsequent reuse in the same machine.

In particular, the conveyor 65 is adapted to convey the recovered material towards the inlet of the second vibro-sifter 62.

The operation of the machine 1 according to the invention is, in the light of the foregoing, completely intuitive.

The granular material M (new or recycled, at the discretion of the producer) is sent, via the input means 11, to the supplying device 9, so as to keep the hopper 34 at a constant fill level.

In particular, the pneumatic propeller 41 performs load cycles in which it collects predetermined quantities of granular material M from the loading hopper 43 (in the case of new material), or from the second vibro-sifter 62 (in the case of recycled material), and sends them to the hopper 34.

Each item P travels on the first conveyor 3, and reaches below the decoration assembly 7.

In particular, each item P first passes below the first module 8, which applies a first layer of adhesive fluid on the surface thereof, according to a certain decorative pattern or motif. Subsequently, the item P passes below the supplying device 9; the latter applies a layer of granular material M on the entire surface of the item P itself, or only on a portion thereof (if the supplying roller 37 is less than the width of the item P, or if it consists of separate portions).

Therefore, a part of the granular material M supplied adheres to the first layer of adhesive fluid.

Subsequently, the item P passes below the second module 10, which applies a second layer of adhesive fluid to the layer of granular material M.

Preferably, the second layer of adhesive fluid is identical to the first layer, i.e., it superimposes the latter perfectly, and the function thereof is to permanently fix the granular material M, deposited by the supplying device 9, which has adhered to the first layer of adhesive fluid.

At this point the item P exits from the action area of the decoration assembly 7, and passes below the removal device 12, which removes (for example, by suction) the exceeding granular material Ni which has not been constrained in position by the second layer of adhesive fluid.

The item P can then continue for the subsequent production stations towards an oven firing step).

Simultaneously with the steps described above, the recovery means 13 collect (and recycle, through the second vibro-sifter 62) both the material dispensed by the supplying device 9 which has not settled on the item P (through the collection member 63), and the material, dispensed on the surface of the item P, which is not constrained thereto (through the hood 56 and the cyclone separator 59).

The object of the present invention is also a method for decorating items granular materials.

The method comprises the steps of applying a first layer of adhesive fluid to the surface of the item P to be decorated, according to a specific decorative pattern or motif; applying a layer of granular material M to the surface of the item P, so that it adheres to said first layer of adhesive fluid; applying a second layer of adhesive fluid to the layer of granular material M, so as to permanently fix the granular material M which has adhered to the first layer of adhesive fluid.

The second layer of adhesive fluid is applied according to a pattern or motif identical to that of said first layer of adhesive fluid.

The method further comprises a step of removing the exceeding granular material M after the application of said second layer of adhesive fluid.

In a more articulated version, in which two distinct and independent decorative motifs (possibly even partially or completely superimposed) are realized on the item P, the method further comprises a step of sequentially applying a third layer of adhesive fluid on the surface of the item P, possibly partially or completely superimposed on the second layer of adhesive fluid previously deposited, a second layer of granular material M, and a fourth layer of adhesive fluid.

The fourth layer of adhesive fluid is deposited according to a pattern identical to that of the second layer of adhesive fluid.

The method further comprises a step of removing the exceeding granular material M after the application of said fourth layer of adhesive fluid.

Figure 9:
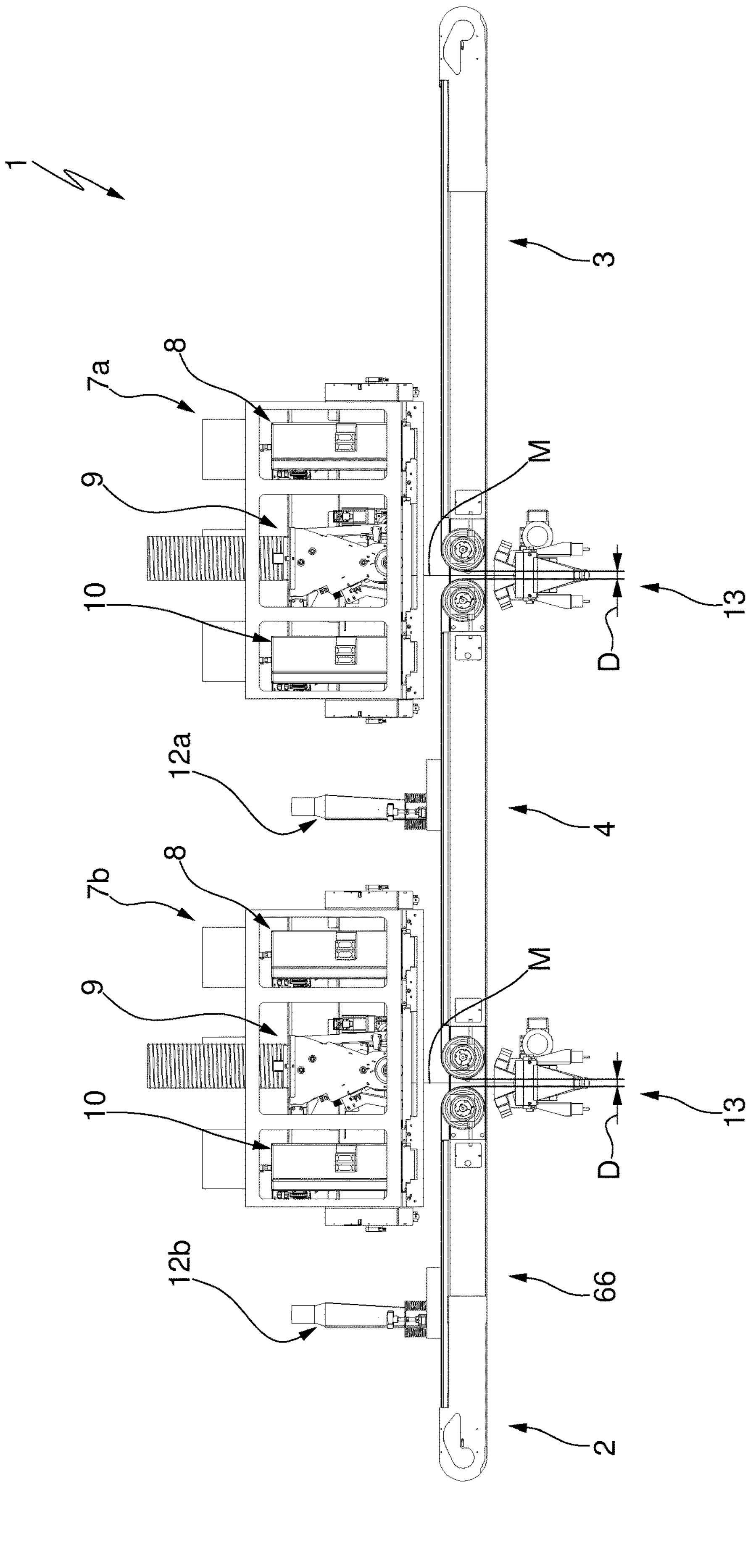
FIG. 9 is a schematic front view of the machine, with various parts removed for greater clarity, according to another embodiment of the invention.

Another embodiment of the machine 1 according to the invention is shown in FIGS. 9. This embodiment differs from the previous one in that the machine 1 comprises a first decoration assembly 7*a* and a second decoration assembly 7*b*, installed one after the other along the same transportation device 2.

Furthermore, the transportation device 2 comprises a first conveyor 3, a second conveyor 4, and further a third conveyor 66 arranged downstream of the second conveyor 4 with reference to the feed direction A and the feed orientation V of the items P, Between the second conveyor 4 and the third conveyor 66 there is a certain space, as provided between the first conveyor 3 and the second conveyor 4, so that the granular material dispensed by the second decoration assembly 7*b* and not deposited on the items P can be recovered.

The machine further comprises a first removal device 12*a*, arranged downstream of the first decoration assembly 7*a*, and a second removal device 12*b*, arranged downstream of the second decoration assembly 7*b*, always with reference to the feed direction A and the feed orientation V of the items P.

In other words, the second removal device 12*b* is interposed between the first decoration. assembly 7*a* and the second decoration assembly 7*b*.

This version of the machine 1 is specifically indicated for creating, on the same item P, decorations comprising multiple decorative patterns or motifs, for example different patterns or motifs and/or made of different granular materials M.

In practical operation, therefore, the first decoration assembly 7*a* perfects a first decorative pattern on the surface of the item P, and the first removal device 12*a* then cot cleans the same surface of the residual material.

Subsequently, the second decoration assembly 7*b* creates a second decorative pattern or motif, independent of the first, on the surface of the item P (even superimposed, at least partially, with the first decorative pattern or motif).

In more detail, the second decoration assembly 7*b* deposits on the pattern previously created by the first decoration assembly 7*a*, or in any case on the surface of the item P, and in sequence, a third layer of adhesive fluid, a second layer of granular material M and a fourth layer of adhesive fluid.

The fourth layer of adhesive fluid may be deposited according to a pattern identical to that of the second layer of adhesive fluid.

The second removal device 12*b* performs the final cleaning.

The item P then proceeds to the next processing step.

It is therefore possible to obtain an item P with a complex and varied decoration, which cannot be obtained with a single decoration assembly 7*a*.

Nothing prevents the machine from comprising even more than two decoration assemblies 7*a*, 7*b*, arranged in sequence one after another to create particularly complex and articulated decorative patterns or motifs.

It has thus been seen how the invention achieves the intended purposes.

The solution of applying a second layer of adhesive fluid to the granular material M previously deposited allows to constrain the material itself so that it cannot be accidentally altered, which could compromise the quality of the result obtained.

The performance of the machine 1 is therefore more predictable and also repeatable so as not to determine an excessive number of items to be discarded.

Furthermore, the particular arrangement of the components of the decoration assembly 7 (i.e. the first module 8, the supplying device 9 and the second module 10), which are arranged very close together, allows the use of adhesive fluids with short drying times, and therefore normally cheaper.

Another considerable advantage of the invention is that the dusts and impurities which accompany the granular material M are completely collected by the supplying device 9 and removed, in particular so that they do not disperse in the environment (where they could harm the health of the operators) and that they do not contaminate the operating area of the heads of the first module 8 and the second module 10.

The present invention has been described according to preferred embodiments; however, equivalent variants can be conceived without departing from the scope of protection defined by the following claims.

The invention claimed is:

1. A machine for decorating items with granular materials, comprising at least one transportation device, for conveying the items to be decorated along a feed direction (A) and a feed orientation (V), and at least one decoration assembly of the items (P), supported above the transportation device and for depositing, on the surface of each item (P), a certain quantity of granular material (M) so as to achieve a determined aesthetic effect, said decoration assembly comprising a first module for dispensing adhesive fluid, of the type provided with heads with dispensing nozzles, for dispensing at least one first layer of adhesive fluid on the surface of the item (P) to be decorated according to a specific decorative pattern or motif, and at least one supplying device of granular material (M), arranged adjacent to said first module and downstream of said first module with respect to said feed orientation (V), for dispensing at least one layer of granular material (M) on the portion of the surface of the item (P) in which the first layer of adhesive fluid is present, wherein said decoration assembly comprises a second module for dispensing adhesive fluid, of the type provided with heads with dispensing nozzles, arranged adjacent to said supplying device and downstream of said supplying device with respect to said feed orientation (V), for dispensing a second layer of adhesive fluid on the layer, previously deposited, of granular material (M), said second layer being superimposed on said decorative pattern or motif created by said first layer of adhesive fluid, wherein said transportation device comprises a first conveyor and a second conveyor aligned along said feed direction (A), in such a way that a certain space is provided at said supplying device between the respective opposite and facing ends, so that the granular material (M) dispensed by said supplying device and not deposited on the items (P) falls through such space so that it may be then collected and recycled.

2. The machine according to claim 1, wherein said decoration assembly comprises at least one outer casing, which completely encloses said first module, supplying device and second module in respective hermetically separated compartments, or said decoration assembly comprises independent casings which define respective hermetically separated compartments for each of said first module, supplying device and second module, in order to prevent the granular material (M) and the dust accompanying it from spreading towards said first module and second module.

3. The machine according to claim 2, wherein said casing is configured, or said casings are configured, so as to provide different respective modes of affecting said three compartments.

4. A machine for decorating items with granular materials, comprising at least one transportation device, for conveying the items to be decorated along a feed direction (A) and a feed orientation (V), and at least one decoration assembly of the items (P), supported above the transportation device and for depositing. on the surface of each item (P), a certain quantity of granular material (M) so as to achieve a determined aesthetic effect, said decoration assembly comprising a first module for dispensing adhesive fluid, of the type provided with heads with dispensing nozzles, for dispensing at least one first layer of adhesive fluid on the surface of the item (P) to be decorated according to a specific decorative pattern or motif, and at least one supplying device of granular material (MD), arranged adjacent to said first module and downstream of said first module with respect to said feed orientation (V), for dispensing at least one layer of granular material (M) on the portion of the surface of the item (P) in which the first layer of adhesive fluid is present, wherein said decoration assembly comprises a second module for dispensing adhesive fluid. of the type provided with heads with dispensing nozzles, arranged adjacent to said supplying device and downstream of said supplying device with respect to said feed orientation (V), for dispensing a second layer of adhesive fluid on the layer, previously deposited, of granular material (M), said second layer being superimposed on said decorative pattern or motif created by said first layer of adhesive fluid, wherein said decoration assembly comprises at least one outer casing, which completely encloses said first module, supplying device and second module in respective hermetically separated compartments, or said decoration assembly comprises independent casings which define respective hermetically separated compartments for each of said first module, supplying device and second module, in order to prevent the granular material (M) and the dust accompanying it from spreading towards said first module and second module, wherein said casing is configured, or said casings are configured, so as to provide different respective modes of affecting said three compartments, and wherein said casing comprises, or said casings comprise, a first fan for overpressurizing the first compartment in which said first module is contained, and a second fan for overpressurizing the third compartment in which said second module is contained.

5. A machine for decorating items with granular materials, comprising at least one transportation device, for conveying the items to be decorated along a feed direction (A) and a feed orientation (V), and at least one decoration assembly of the items (P), supported above the transportation device and for depositing, on the surface of each item (P), a certain quantity of granular material (M) so as to achieve a determined aesthetic effect, said decoration assembly comprising a first module for dispensing adhesive fluid, of the type provided with heads with dispensing nozzles, for dispensing at least one first layer of adhesive fluid on the surface of the item (P) to be decorated according to a specific decorative pattern or motif, and at least one supplying device of granular material (M), arranged adjacent to said first module and downstream of said first module with respect to said feed orientation (V), for dispensing at least one layer of granular material (M) on the portion of the surface of the item (P) in which the first layer of adhesive fluid is present, wherein said decoration assembly comprises a second module for dispensing adhesive fluid, of the type provided with heads with dispensing nozzles, arranged adjacent to said supplying device and downstream of said supplying device with respect to said feed orientation (V), for dispensing a second layer of adhesive fluid on the layer, previously deposited, of granular material (M), said second layer being superimposed on said decorative pattern or motif created by said first layer of adhesive fluid, wherein said decoration assembly comprises at least one outer casing. which completely encloses said first module, supplying device and second module in respective hermetically separated compartments, or said decoration assembly comprises independent casings which define respective hermetically separated compartments for each of said first module, supplying device and second module, in order to prevent the granular material (M) and the dust accompanying it from spreading towards said first module and second module.

wherein said casing is configured, or said casings are configured, so as to provide different respective modes of affecting said three compartments, and wherein said casing comprises, or said casings comprise, a suction device for removing from the second compartment, in which said supplying device is contained, the dusts and impurities that spread during the dispensing of the granular material (M).

6. The machine according to claim 1, wherein said supplying device comprises a hopper, within which the granular material (M) to be deposited on the items (P) is collected, and a supplying roll, supported at the base of said hopper, for causing, with its own rotation, the fall of the granular material (M) on the items (P) in transit, said supplying roll being operable to rotate at a variable speed of rotation.

7. The machine according to claim 1, comprising a device for removing the exceeding granular material (M) from the surface of the items (P) exiting from said decoration assembly.

8. The machine according to claim 1, comprising a first decoration assembly and a second decoration assembly, installed one after the other along a same transportation device.

9. The machine according to claim 8, comprising a first removal device, arranged downstream of said first decoration assembly, and a second removal device, arranged downstream of said second decoration assembly, with reference to the feed direction (A) and to the feed orientation (V) of the items (P) on said transportation device.

10. The machine according to claim 8, wherein said transportation device comprises said first conveyor, said second conveyor and a third conveyor, arranged downstream of said second conveyor with reference to the feed direction (A) and to the feed orientation (V) of the items (P), between the respective opposite and facing ends of said conveyors being provided respective spaces at the supplying devices of said first decoration assembly and of said second decoration assembly, so that the granular material (M) supplied by said supplying devices and not deposited on the items (P) falls through such spaces so that it may be then collected and recycled.

* * * * *